United States Patent [19]

Calhoun et al.

[11] Patent Number: 5,030,007
[45] Date of Patent: Jul. 9, 1991

[54] SYSTEM FOR VIBRATION ISOLATION OF FT-IR INTERFEROMETERS

[75] Inventors: David S. Calhoun, Menlo Park, Calif.; Mark S. Roth, White Fish Bay, Wis.

[73] Assignee: Measurex Corporation, Cupertino, Calif.

[21] Appl. No.: 417,315

[22] Filed: Oct. 5, 1989

Related U.S. Application Data

[63] Continuation-in-part of Ser. No. 396,565, Aug. 18, 1989, abandoned.

[51] Int. Cl.[5] ............................ G01B 9/02; G01J 3/45
[52] U.S. Cl. .................................................. 356/346
[58] Field of Search ........................................ 356/346

[56] References Cited

U.S. PATENT DOCUMENTS

| | | | |
|---|---|---|---|
| 4,552,723 | 11/1985 | Adams et al. | 356/346 X |
| 4,556,316 | 12/1985 | Doyle | 356/346 |
| 4,693,603 | 9/1987 | Auth | 356/346 |
| 4,871,142 | 10/1989 | de Mey, II | 248/632 |

Primary Examiner—Davis L. Willis
Assistant Examiner—Matthew W. Koren
Attorney, Agent, or Firm—Burns, Doane, Swecker & Mathis

[57] ABSTRACT

In an on-line scanning sensor system, certain components of an FT-IR interferometer are isolated from vibrations that cause inaccuracies in measurements provided by the system, thereby allowing the sensor system to be used on-line in manufacturing environments. More particularly, vibration-absorbing suspension devices suspend selected interferometer components such that the center of suspension of the suspended interferometer component is substantially coincident with the center of gravity of the suspended components.

9 Claims, 3 Drawing Sheets

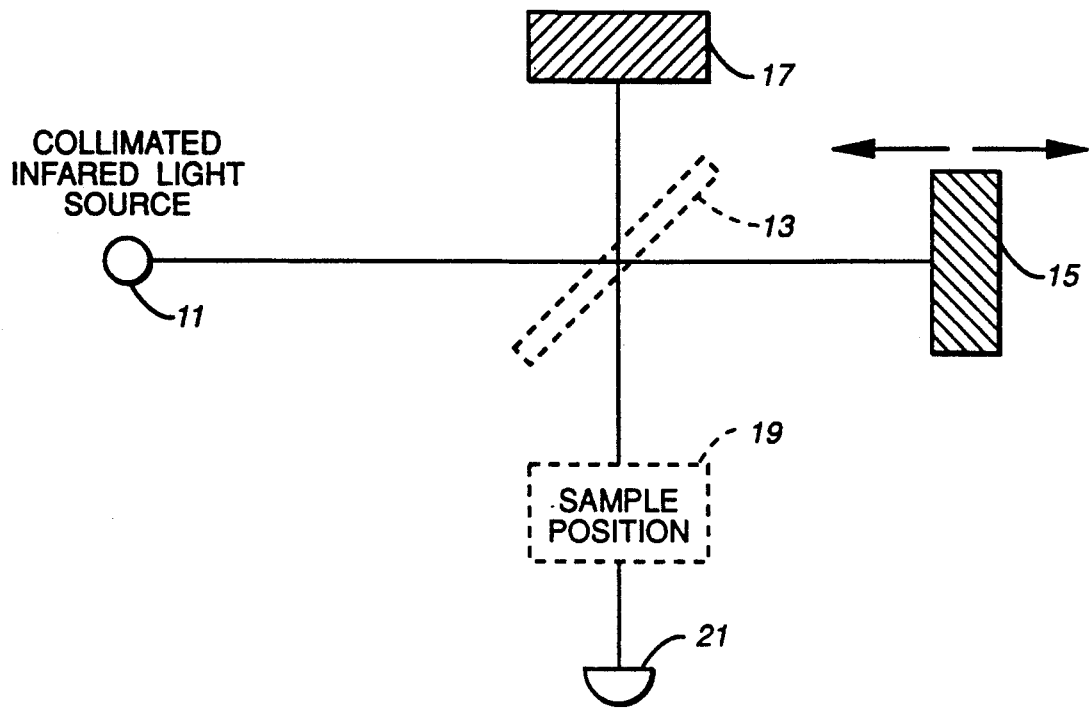
FIG._1
*(PRIOR ART)*
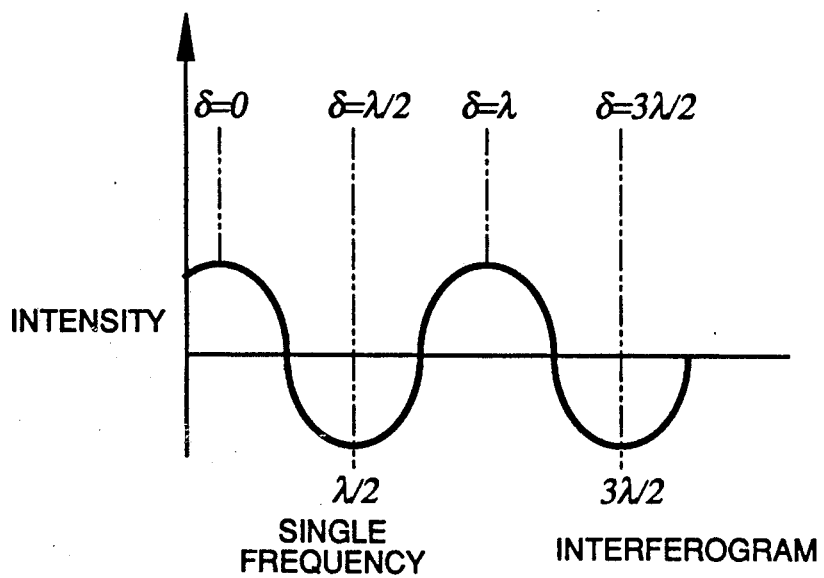
FIG._2

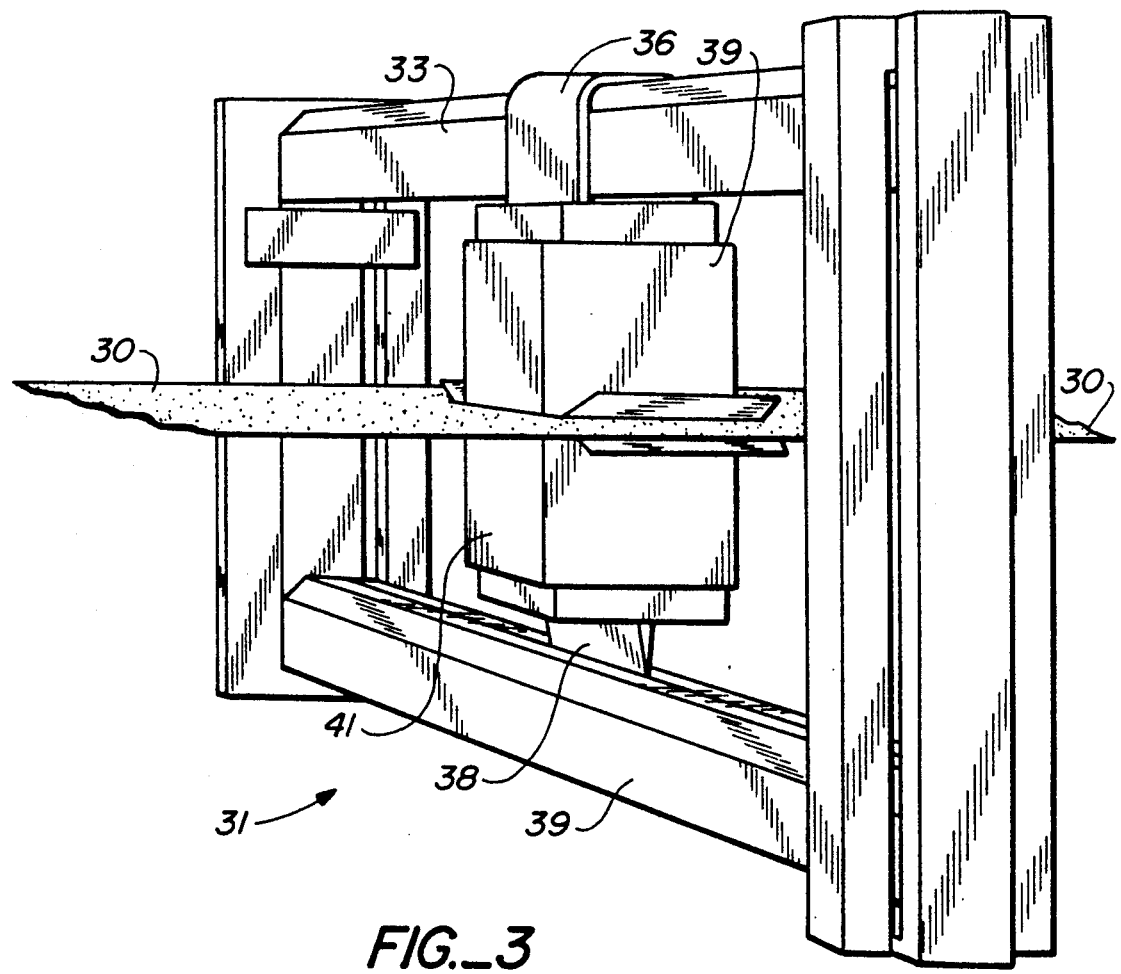
FIG._3

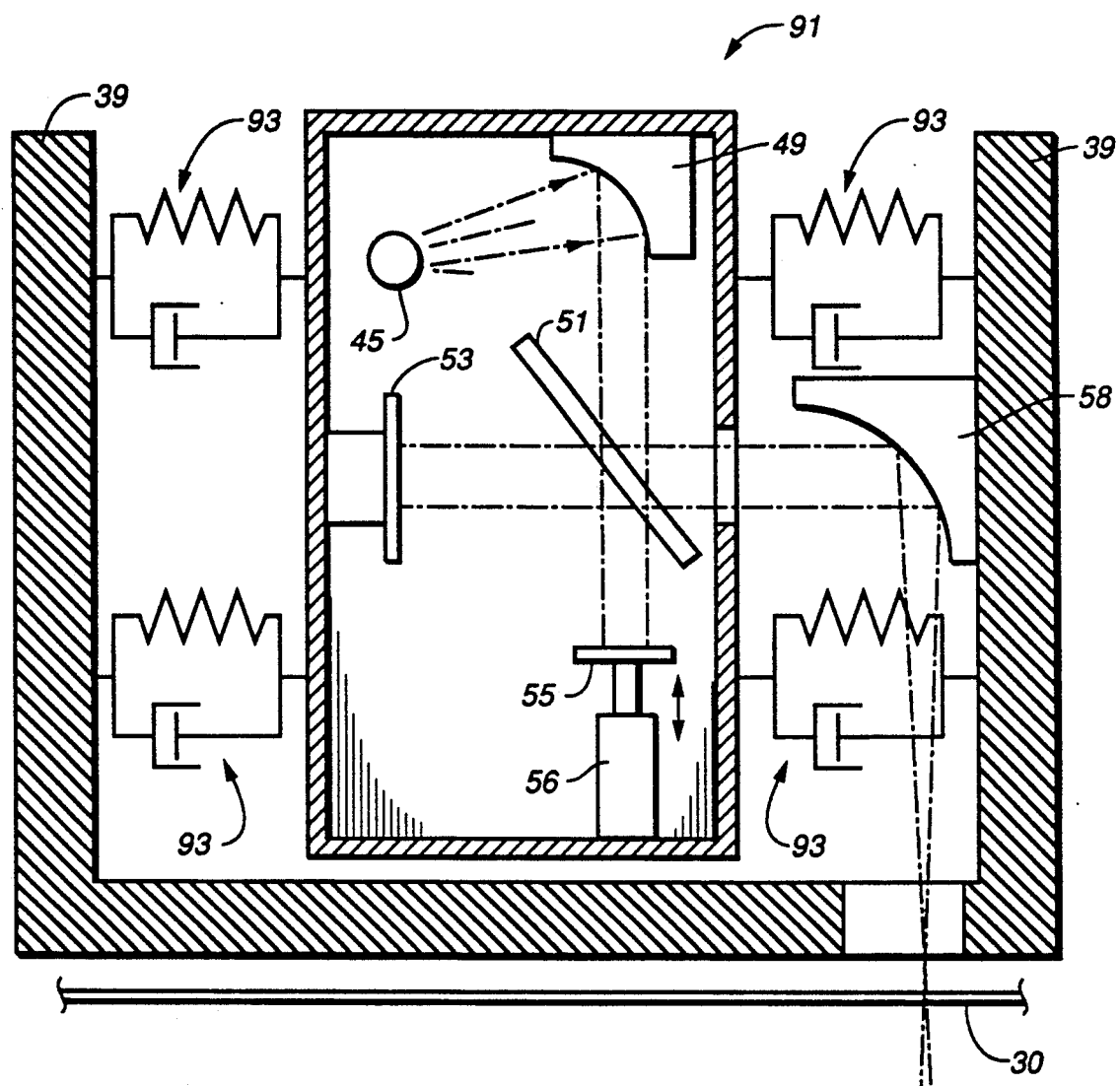
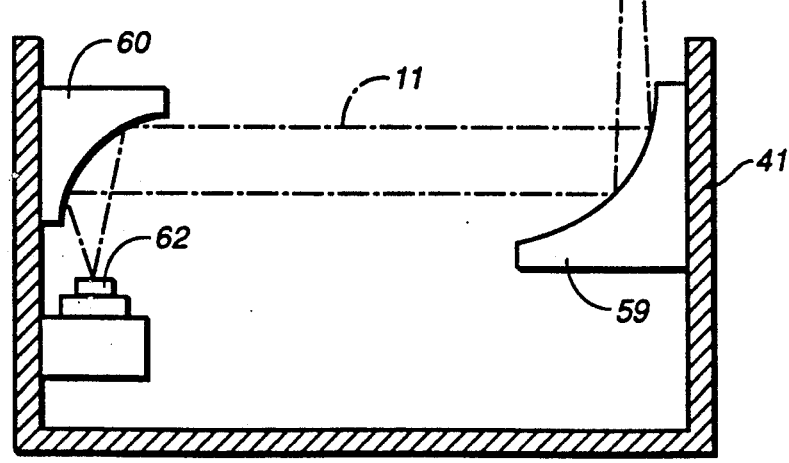
FIG._4

SYSTEM FOR VIBRATION ISOLATION OF FT-IR INTERFEROMETERS

RELATED APPLICATION

The present application is a continuation-in-part of copending application Ser. No. 07/396,565 filed in the United States Patent and Trademark Office on Aug. 21, 1989, now abandoned, and commonly assigned herewith.

BACKGROUND OF THE INVENTION

1. Field of the Invention

The present invention generally relates to the on-line detection of characteristics of sheet materials and, more particularly, to spectrometric detection of the characteristics of sheet materials.

2. State of the Art

Although various properties of sheet materials can be detected by laboratory tests, such tests have several inherent drawbacks. For example, one shortcoming of laboratory tests is that they require substantial time for sample acquisition and analysis. Another drawback of laboratory tests is that the samples obtained for testing may not accurately represent sheet material that has been produced.

To overcome the shortcomings of laboratory tests of sheet materials, devices have been proposed for detecting sheet properties "on-line," i.e., while a sheet-making machine is operating. On-line sensor devices for paper materials, for instance, can detect sheet properties such as basis weight, dry basis weight, moisture content, and thickness. It is well known to operate on-line sensor devices so that they periodically traverse, or scan, a traveling web of the sheet material. Normally, scanning is done in the cross direction; i.e., in the direction perpendicular to the direction of sheet travel. Depending upon the sheet-making operation, cross-directional distances can range up to about 400 inches or more.

Although a wide variety of sensor devices have been used for on-line scanning, there have been difficulties in attempts to use on-line spectrometers based upon interferometers. In part, the difficulties reflect the fact that interferometers inherently require precise positional relationships to be maintained to produce meaningful measurements. Also, the difficulties reflect the fact that interferometers normally are designed for laboratory use, not for use in manufacturing environments where there may be substantial vibrations from heavy an high-speed rotating machinery.

SUMMARY OF THE INVENTION

Generally speaking, the present invention provides an on-line scanning sensor system wherein certain components of an FT-IR interferometer are isolated from vibrations that cause inaccuracies in measurements provided by the system, thereby allowing the sensor system to be used on-line in manufacturing environments.

In the preferred embodiment of a on-line scanning sensor system according to the present invention for spectrometrically detecting characteristics of traveling sheet materials and the like, the system comprises the combination of:

a) first carriage means for scanning motion across a traveling sheet of material;
b) interferometer component means mounted to be carried by the first carriage means, the interferometer component means including at least a source of infrared light, a beam splitting means, a fixed planar mirror means, a movable planar mirror means, and a first parabolic mirror means;
c) second carriage mean for scanning motion across a traveling sheet of material in registration with the interferometer component means;
d) second parabolic mirror means and detector means carried by the second carriage means for receiving light from the interferometer component means as it travels during scanning; and
e) vibration-absorbing suspension means for suspending the interferometer component means such that the center of suspension of the interferometer component means is substantially coincident with its center of gravity.

Further in the preferred embodiment of the present invention, the scanning sensor system includes a rigid frame to which the components of the interferometer component means are fixed such that vibrations only cause translational motion, not rotation, of the interferometer component means.

In the system, the first parabolic mirror means provides a point of focus that is substantially coincident with the surface of a traveling sheet whose characteristics are to be detected. Alternatively, as when detecting characteristics of transparent sheets, the first parabolic mirror means can provide a point of focus that is substantially spaced from the surface of a traveling sheet whose characteristics are to be detected.

BRIEF DESCRIPTION OF THE DRAWINGS

The present invention can be further understood by reference to the following description and appended drawings which illustrate the preferred embodiments of the invention. For purposes of clarity, identical parts are given the same reference numbers in the various drawing figures. In the drawings:

FIG. 1 is a block diagram showing the major components of a FT-IR interferometer according to the prior art;

FIG. 2 is an example of an interferogram of a single frequency of light produced by the interferometer of FIG. 1;

FIG. 3 is a schematic pictorial view of a scanning FT-IR sensor system in accordance with the present invention; and FIG. 4 is a diagram of details of the F-TIR sensor system of FIG. 3.

DETAILED DESCRIPTION OF THE PREFERRED EMBODIMENT

FIG. 1 shows a simple two-beam Michelson interferometer. Generally speaking, the interferometer comprises a light source 11 for providing a beam of collimated light, a beam splitting mirror 13 for receiving the collimated light, a movable planar mirror 15, a fixed planar mirror 17, a sample holder 19, and a photosensitive detector 21. In practice, it is convenient to select a light source that provides infrared (IR) light; hence, the interferometer of FIG. 1 can be referred to as in IR interferometer.

In operation of the interferometer of FIG. 1, source 11 directs infrared light onto beam-splitting mirror 13 where the light is partially reflected to fixed mirror 17 and partially transmitted to movable mirror 15. Thus, the beam-splitting mirror creates two separate optical paths. In the first optical path, fixed mirror 17 reflects light back to the beam-splitting mirror which partially reflects the light to source 11 and partially transmits the light onto photosensitive detector 21. In the other optical path, movable mirror 15 reflects light back to beam splitting mirror 13 which partially transmits the light to the source and partially reflects the light to the photosensitive detector. Normally, the movable mirror is driven back and forth at a constant velocity in a direction perpendicular to the incident light.

A critical feature of the interferometer of FIG. 1 is that the two optical path beams are recombined at beam-splitting mirror 13. The recombined beam that reaches photosensitive detector 21 is, therefore, the sum of the light reflected from fixed mirror 17 and from movable mirror 15. Depending upon the location of the movable mirror, the two beams that are recombined may, or may not, be in phase relative to any given frequency of light. The difference in length between the two optical paths is often referred to as the "retardation" distance, commonly represented by the symbol $\delta$.

FIG. 2 shows an example of an interferogram that can be produced by the system of FIG. 1 for the case where the source light has only one wavelength. More particularly, the interferogram is produced by the output of photosensitive detector 21 a movable mirror 15 is translated. The maxima in the interferogram are produced when the retardation distance, $\delta$, is equal to an integral multiple of the wavelength value, $\lambda_o$, of the source light; that is, the maxima are produced when $\delta = n\lambda_o$, where $n = 0$, $+1$, $+2$, and so forth. In those cases, the recombined beams are perfectly in phase and are said to interfere "constructively". The minima in the interferogram occur when the retardation is a odd multiple of half wavelengths and, under those circumstances, the recombined beams are out of phase and interfere "destructively."

An interferogram such as the one shown in FIG. 2 can be described as a sinusoidal wave. In practice, it is convenient to transform such interferograms to obtain representations in terms of their frequency components. The frequency representations can be obtained by transforming the interferograms by numerical methods such as Fast Fourier Transforms so that spectral representations, or spectrograms, are obtained that display the amplitudes of each of the frequencies that comprise the interferograms.

FT-IR interferometers have a wide variety of uses including, for example, the study of polymer compositions. To detect the composition of materials using the system of FIG. 1, a material sample would be placed in holder 19 to lie in the path of the recombined beam of infrared light following beam splitter 13. More particularly, the sample would be prepared such that at least some of the light in the incident beam passes through the sample onto a photosensitive detector. Of the light which was incident on the polymeric sample, some wavelengths would be absorbed and others would not be. Because the infrared absorption spectrum of a polymer is a direct measurement of its chemical structure, identification of the absorbed spectrum facilitates identification of the polymer sample.

At this juncture, it should be realized that the foregoing describes FT-IR interferometers that are employed for laboratory analysis of materials. Such applications are normally characterized by procedures whereby samples are held stationary and are analyzed as long as necessary to obtain satisfactory spectral resolution. Such applications are also characterized by environments that are relatively free of vibrations. Finally, in such environments, FT-IR interferometers are generally stationary while in use.

FIG. 3 shows a scanning sensor system for analyzing a traveling sheet of material 30. The sheet material can comprise, for example, polymeric substances such as polyethylene, polypropylene, ethylene vinyl alcohol, polyvinylidene chloride, Nylon, Surlyn, ethylene vinyl acetate, alone or in co-extruded combinations. The sheet material may have single or multiple layers, each comprised of a different substance. The output of the sensor system provides information as to weights and/or thicknesses of the layers that comprise the scanned sheet.

The scanning sensor system in FIG. 3 includes a stationary frame, generally designated by the number 31, having a pair of parallel guide members 33 and 35 that extend across opposite sides of a traveling sheet 30. First and second carriage members 36 and 38, respectively, are mounted to travel on guide members 33 and 35. It should be understood that the carriage members are conventional and are connected to a drive system (not shown) that drives the carriage members back and forth along the respective guide members to traverse a traveling sheet.

As further shown in FIG. 3, the sensor system includes a housing 39 for the components of a FT-IR interferometer except for the detector components of the interferometer. Also, the sensor system includes a separate housing 41 for an IR detector that operates in cooperation with the components carried in housing 39. It should be noted that housing 39 is connected to carriage member 36 for travel therewith and, likewise, housing 41 is connected to carriage member 38 for travel therewith.

In operation of the scanning sensor system of FIG. 3, housings 39 and 41 are driven back and forth along the guide members in registration with one another while sheet 30 passes freely between them. Thus, the components within housing 39 travel independently, but generally in parallel, with the detector components within housing 41. In practice, the scanning rate ranges up to about one foot per second. Typically, the rate of travel of the sheet through the sensor system usually ranges from about forty to about four-hundred feet per minute.

Referring now to FIG. 4, it can be seen that the components of the interferometer carried in housing 39 include a source of infrared light 45, a collimating mirror 49 for collimating light from source 45, a beam-splitting mirror 51, and first and second planar mirrors 53 and 55. First planar mirror 53 is fixed in position, and second planar mirror 55 is selectively movable in a direction perpendicular to the incident beam. A mechanism 56 is provided for driving movable mirror 55 back and forth at a generally constant velocity.

It will be noted that many of the components in FIG. 4 are similar to those shown in FIG. 1 and, in fact, operate in substantially the same manner. More particularly, in operation of the system of FIG. 4, light source 45 directs divergent light onto collimating mirror 49 which collimates and reflects the incident light onto beam-splitting mirror 51. Then, beam splitting mirror 51 splits the collimated light so that it is sent to mirrors 53 and 55 along two separate optical paths and then recombined. Movable mirror 55 translates back and forth to cause the recombined beams to periodically interfere, both constructively and destructively.

In contrast to the interferometer of FIG. 1, the recombined beams of infrared light in the system of FIG. 4 are not transmitted onto a stationary sample and then to a stationary photosensitive detector. Instead, in the system of FIG. 4, the recombined light is focused by a first parabolic mirror 58 and passed through traveling sheet 30 to a second parabolic mirror 59. The second parabolic mirror directs a generally parallel beam of light to a third parabolic mirror 60 that, in turn, focuses the light onto a photosensitive detector 62. It should be understood that other mirrors or lenses, not shown in the drawings, can be included in the system for focusing and/or for changing the direction of light along the beam path.

The above-described scanning sensor system is particularly designed to operate in environments that include vibrations that could, unless compensated for, adversely affect the measurements provided by the system. In other words, the scanning sensor system is designed to operate in factory floor environments. In such environments, vibrations can arise, for example, from sheetmaking machinery or from the components of the drive for the scanning sensor system. To the extent that vibrations might randomly increase or decrease the retardation distance within the interferometer, the accuracy of the sensor system would be adversely affected. In fact, even vibrations that displace the retardation distance by even a fraction of a micron can cause substantial losses in accuracy.

To reduce the adverse effects of vibrations on the above-described scanning sensor system, all of the components within housing 3 except for parabolic mirror 58 are mounted on a rigid frame 91 that is connected to housing 39 by vibration-absorbing suspension devices 93. The rigid frame could comprise, for example, one or more metal plates that are welded or otherwise securely fixed together. In practice, the vibration-absorbing suspension devices are highly compliant, or "soft," for substantially attenuating low frequency vibrations (e.g., vibrations whose frequency is less than about twenty hertz.)

In practice, the vibration-absorbing suspension devices 93 are comprised of elastomeric flexible couplings and, more particularly, of bonded rubber springs. Such mounting devices are commercially available from Lord Kinematics Division of Lord Corporation of Erie, Pennsylvania. In particular, the Lord Kinematics multiplane mountings can be used.

Further as shown in FIG. 4, rigid frame 91 is mounted such that the center of suspension as provided by the vibration-absorbing suspension devices 93 is substantially coincident with the collective center of gravity of the rigid frame and the components mounted thereon. Such mounting allows rigid frame 91 to undergo translatory motion (i.e., straight line motion) but prevents rotational movement in response to vibrations. This is important for maintaining optical alignment and imaging in the scanning sensor system while permitting vibrational movement in response to vibrations that are not completely attenuated by vibration-absorbing suspension devices 93. More particularly, because the centers of suspension and gravity coincide, vibrations that cause translatory motion of the rigid frame do not affect the angle at which the beam strikes parabolic mirror 58 and, hence, do not change the point of focus of parabolic mirror 58.

Preferably, the system of FIG. 4 is designed such that detector 62 is "over filled" with light. That is, the system components are designed such that the diameter of the beam incident upon detector 62 exceeds the detector's effective cross-sectional area. As a result, the three parabolic mirrors 58–60 can vibrate without causing the beam to move off the detector and, hence, without adversely affecting the intensity of light as seen by detector 62.

Further with regard to FIG. 4, it should be noted that the point of focus of parabolic mirror 58 is substantially coincident with the surface of traveling sheet 30. In practice, precise coincidence is not required. In fact, in situations where sheet 30 is transparent, the point of focus of parabolic mirror 58 preferably is spaced substantially from the sheet surface. In such cases, the beam diameter normally is between about 0.3 and 0.6 inches when the beam is incident upon a sheet whose characteristics are to be measured.

The foregoing has described the principles, preferred embodiments and modes of operation of a scanning sensor system that not only provides spectrometric measurements while the sheets being measured are in motion but, also, provides measurements while an interferometer instrument itself is in motion. However, the present invention should not be construed as being limited to the particular embodiments discussed. Instead, the above-described embodiments should be regarded only as illustrative, and it should be appreciated that workers skilled in the art may make variations in those embodiments without departing from the spirit or scope of the present invention as defined by the following claims.

WHAT IS CLAIMED IS:

1. An on-line scanning sensor system for spectrometrically detecting characteristics of traveling sheet materials and the like, comprising:
   first carriage means for scanning motion across a traveling sheet of material;
   interferometer component means mounted to be carried by the first carriage means, the interferometer component means including at least a source of infrared light, a beam splitting means, a fixed planar mirror means, a movable planar mirror means, and a first parabolic mirror means;
   second carriage means for scanning motion across a traveling sheet of material in registration with the interferometer component means;
   second parabolic mirror means and detector means carried by the second carriage means for receiving light from the interferometer component means as it travels during scanning; and
   vibration-absorbing suspension means for suspending the interferometer component means such that the center of suspension of the interferometer component means is substantially coincident with its center of gravity.

2. A system according to claim 1 further including a rigid frame means to which the interferometer component means is fixed.

3. A system according to claim 2 wherein the vibration-absorbing suspension means supports the rigid frame means such that vibrations only cause translational motion, not rotation, of the interferometer component means.

4. A system according to claim 3 wherein the first parabolic mirror means provides a point of focus for reflected light that substantially coincides with the surface of a traveling sheet whose characteristics are to be detected.

5. A system according to claim 3 wherein the first parabolic mirror means provides a point of focus for reflected light that is substantially spaced from coincidence with the surface of a traveling sheet whose characteristics are to be detected.

6. A system according to claim 5 wherein, at the surface of the sheet, the diameter of the beam of light reflected from the second parabolic mirror means is less than about 0.6 inches at the plane of coincidence with the surface of a traveling sheet whose characteristics are to be detected.

7. A system according to claim 6 wherein, at the surface of the sheet, the diameter of the beam of light reflected from the second parabolic mirror means exceeds about 0.3 inches at the plane of coincidence with the surface of a traveling sheet whose characteristics are to be detected.

8. An on-line scanning sensor system for spectrometrically detecting characteristics of traveling sheet materials and the like, comprising:
   first carriage means for scanning motion across a traveling sheet of material;
   interferometer component means mounted to be carried by the first carriage means, the interferometer component means including at least a source of infrared light, a beam splitting means, a fixed planar mirror means, a movable planar mirror means, and a first parabolic mirror means mounted such that the first parabolic mirror means provides a point of focus for reflected light that is substantially spaced from coincidence with the surface of a traveling sheet whose characteristics are to be detected;
   second carriage means for scanning motion across a traveling sheet of material in registration with the interferometer component means;
   second parabolic mirror means and detector means carried by the second carriage means for receiving light from the interferometer component means as it travels during scanning; and
   vibration-absorbing suspension means for suspending the interferometer component mean such that the center of suspension of the interferometer component means is substantially coincident with its center of gravity.

9. An on-line scanning sensor system for spectrometrically detecting characteristics of traveling sheet materials and the like, comprising:
   first carriage means for scanning motion across a traveling sheet of material;
   interferometer component means mounted to be carried by the first carriage means, the interferometer component means including at least a source of infrared light, a beam splitting means, a fixed planar mirror means, a movable planar mirror means, and a first parabolic mirror means mounted such that the first parabolic mirror means provides a point of focus for reflected light that substantially coincides with the surface of a traveling sheet whose characteristics are to be detected;
   second carriage means for scanning motion across a traveling sheet of material in registration with the interferometer component means;
   second parabolic mirror means and detector means carried by the second carriage means for receiving light from the interferometer component means as it travels during scanning; and
   vibration-absorbing suspension means for suspending the interferometer component means such that the center of suspension of the interferometer component means is substantially coincident with its center of gravity.

* * * * *